US005299478A

United States Patent [19]

Schorn et al.

[11] Patent Number: 5,299,478

[45] Date of Patent: Apr. 5, 1994

[54] METHOD FOR CONTROLLING PUNCH PRESS NOISE

[75] Inventors: Gerard J. Schorn, Southampton; James R. Hunter, Chadds Ford, both of Pa.

[73] Assignee: Murata Machinery, Ltd., Aichi, Japan

[21] Appl. No.: 77,706

[22] Filed: Jun. 15, 1993

Related U.S. Application Data

[63] Continuation of Ser. No. 819,322, Jan. 14, 1992, abandoned.

[51] Int. Cl.[5] .......................... B26D 5/12; G06F 15/46

[52] U.S. Cl. .......................................... 83/13; 83/74; 83/639.100; 72/21; 364/474.190; 364/508

[58] Field of Search .................. 83/13, 74, 639.1, 137; 72/21; 364/424.05, 474.17, 474.19, 508

[56] References Cited

U.S. PATENT DOCUMENTS

| | | | |
|---|---|---|---|
| 4,022,096 | 5/1977 | Forichon | 83/639.1 |
| 4,030,391 | 6/1977 | Swanson et al. | 83/137 |
| 4,597,535 | 7/1986 | Fontanille | 241/35 |
| 4,823,658 | 4/1989 | Spicer | 83/74 |
| 5,027,631 | 7/1991 | Naito | 72/441 |
| 5,040,734 | 8/1991 | Belchamber et al. | 241/33 |
| 5,170,358 | 12/1992 | Delio | 364/508 |

*Primary Examiner*—Scott Smith
*Attorney, Agent, or Firm*—John R. Benefiel

[57] ABSTRACT

A method for controlling punch press noise in which the noise level produced is monitored by a detector and the press ram velocity is modified in real time to keep the noise level within preset limits. A time weighted average noise level is also controlled by varying the ram velocity for punching operations over a period of operation to maintain a projected time weighted average within a preset limit.

1 Claim, 1 Drawing Sheet

METHOD FOR CONTROLLING PUNCH PRESS NOISE

This is a continuation of copending application(s) Ser. No. 07/819,322 filed on Jan. 14, 1992, now abandoned.

BACKGROUND OF THE INVENTION

This invention concerns industrial processes and more particularly metal cutting, such as punching or shearing in which significant sound noise is generated, creating working environmental problems. Sound or noise level is a function of many variables, i.e., material hardness and thickness, punch size, punch shear, impact velocity, punching velocity, and stripping velocity.

Considerable work has been done in this area to alleviate the noise problem in punching operations. See published UK patent application GB 2036923A in which a damping device is used to alleviate noise and vibrations in a punch press as an example.

It has heretofore been proposed to use a hydrauliccylinder coupled to the ram to drive the punch, with feed back control systems employed to provide precise control over punching velocities. See U.S. Pat. No. 4,116,122 for an example of a press using such a control system to improve the quality of the punched part.

In U.S. Pat. No. 4,823,658, controlled ram speed is described as allowing reduced punching noise.

U.S. Pat. No. 4,208,935 describes a feed back control over the punch ram to reduce the exit speed of the punch at the end of the punching process to eliminate noise and strain.

U.S. Pat. Nos. 5,031,431 and 5,027,631 and UK published application GB2186394A describe reducing ram velocities to limit sound or noise in accordance with stored programs which have previously been calculated or empirically determined to keep noise limits within acceptable limits for particular legal limits. In some cases time of shear or ram pressure are relied to correlate with noise level which may or may not hold true in practice.

These approaches require extensive and time consuming testing and compilation of data and elaborate computer programs and stored data libraries to carry out, and actual results may vary from calculated noise levels. Stripping noise is not accounted for.

In the event that the daily average level of noise exposure is limited by legal authorities or that limits are otherwise desirable as to avoid the need for wearing ear protection, the prior control schemes do not provide any means to insure that allowable time averaged noise levels are not exceeded.

In addition, the effects of the operation of nearby machinery or other various factors unique to a particular location are not able to be taken into account.

The object of the present invention is to eliminate the need for theoretical studies or extensive laboratory testing and elaborate computer programs, and to provide a means to insure that time averaged noise levels and or peak level noise are not exceeded.

SUMMARY OF THE INVENTION

The present invention comprises a system in which a noise or vibration detector is combined with a press ram control system so that the programmed punching process is controlled in real time to be carried out entirely within desired noise limit parameters, including maximum or peak noise levels or time weighted average noise exposure limits.

This combination creates the possibility for a wide variety of control schemes to limit sound or noise while maximizing productivity over a processing period.

At its simplest, the punching process can be controlled to stay within peak sound or noise limits by reducing the programmed ram velocity with a positional feedback servo controlled hydraulic press ram for subsequent similar programmed punching operations after the detector detects excessive sound or noise generation in a sample punch operation.

In a more complex version of the controlled process program, a time weighted average limit of the noise level can be maintained, as by extrapolation of the time weighted average to a period of punch operation, i.e. over one shift, from the sampled punch cycles, and correspondingly adjusting the velocities and cycle frequencies of subsequent programmed punch cycles to limit the time weighted average over a production cycle in the most efficient manner.

This control can be integrated with stored program data for particular punching operations to modify the same in accordance with actual results and actual conditions such as sound or noise contributed by operation of surrounding equipment.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
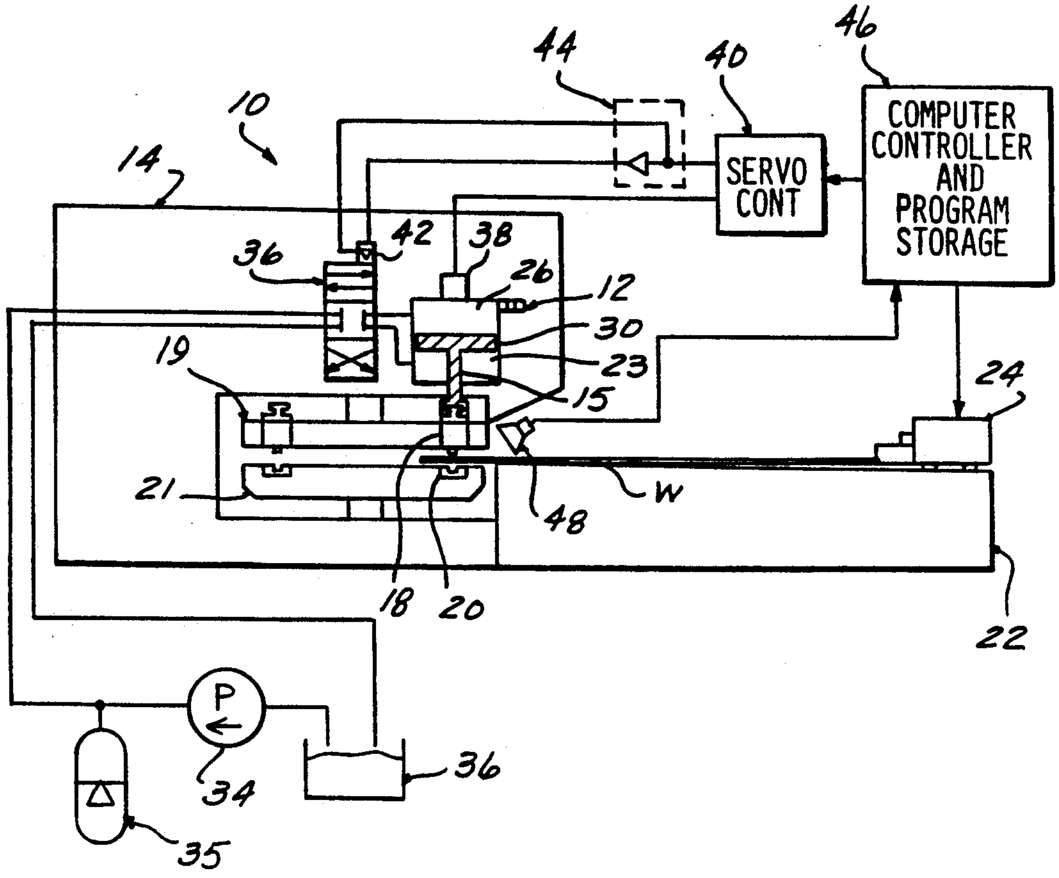
FIG. 1 is a diagrammatic representation of the system according to the present invention.

Referring to FIG. 1, the components of a punch press 10 is represented diagrammatically including a hydraulic cylinder 12 mounted on a press frame 14 adapted to drive a ram 15 coupled to a punch 18 carried by an upper turret 19, to drive the punch through a workpiece W and into a matching die 20 carried by a lower turret turned 21.

The workpiece W is disposed on a table 22 and driven by a gripper carriage 24 in an X-Y plane to properly position the workpiece for a given punch operation at the location of the ram 15.

According to the requirements of the preset invention, the hydraulic cylinder 14 is a double acting hydraulic cylinder having an upper chamber 26 above a piston 30 driving the ram 15 down and a lower chamber 28 driving the ram 15 up. When the respective chambers 26, 28 are controllably pressurized or vented by operation of a servo valve 32 communications with a source of hydraulic fluid under pressure such as a pump 34, accumulator 35 and a reservoir 36 containing unpressurized hydraulic fluid.

The control system includes a position feedback transducer 38 tracking the position of the ram 15 and supplying an error signal to a servo controller 40 so as to enable a precisely controlled ram velocity to be achieved. Preferably a valve spool position feedback transducer 42 is also used with a valve amplifier 44 to improve the performance of the control system. Such control arrangements are known and are essentially described in the above referenced patents.

The sequencing of the punch press operation including turret rotation, to select tools carriage drive to properly locate the workpiece W, etc. is carried out under the control of a software program contained in a computer controller 46 in the general manner well known in the art.

The ram velocity is desirably controlled to minimize punching sound or noise, but this is done in real time according to the concept of the present invention by utilizing a sound or vibration detector 48 positioned at the station whereat punching is carried out to directly measure sound or noise and generate signals corresponding to the magnitude of the sound or noise level, i.e., the level of sound or noise in real time, and generate signals corresponding thereto.

Thus, velocities of the ram 15 during penetration can be limited to reduce sound or noise to maximum permissible levels for any given tool or punch operation, by sampling the noise level actually reached for a given tool or punching operation. If the noise level exceeds a preset level, the velocities for subsequent penetrations can be reduced to low levels minimizing the sound or noise to the extent possible. That is, to velocities on the order of 2-5 inches per second compared with 30 inches per second for normal speed punching. A typical sound level limit is 85 dba, the limit requiring ear protection.

A preset time weighted average can also be easily maintained, by extrapolating by calculation the time weighted average that will be reached over a given period, i.e. one work shift, based on the actual readings of sample punching operations and time of the sample. Typically an average of 90 dba average for an eight hour shift cannot be exceeded.

Thus, if a time weighted average limit is extrapolated to be exceeded, the ram velocities can be correspondingly reduced over the remaining punch press cycles, and/or the frequency of the punch cycles, to reduce the overall number of punch operations for the remaining time of the period.

The manner of achieving maximum efficiency in reducing the sound or noise level can be calculated by a suitable program for the computer controller 46.

Figure 2:
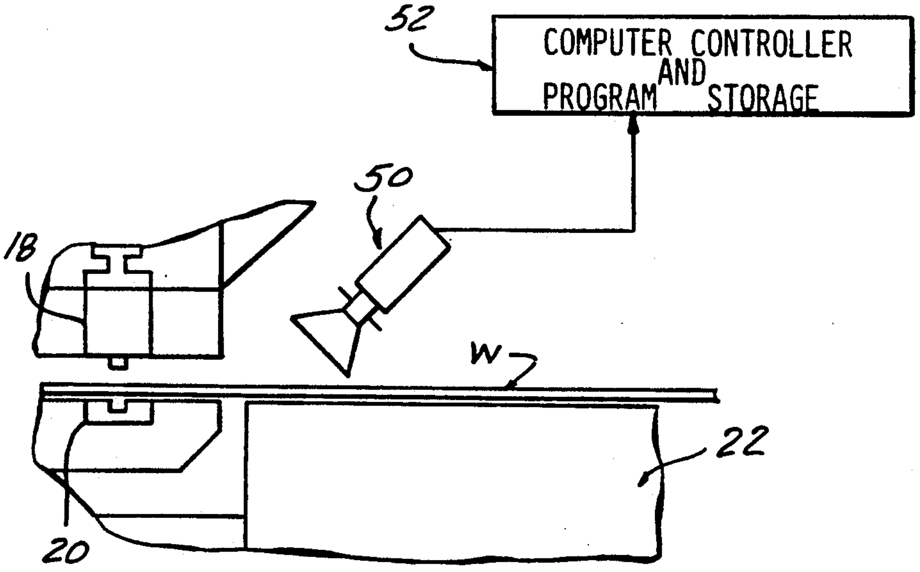
FIG. 2 is a diagrammatic representation of an alternate embodiment of the invention.

An acoustic dosimeter 50 can be employed in an alternative embodiment shown in FIG. 2. Acoustic dosimeters are commercially available which will generate readings of extrapolated time weighted averages over a period of time. The output of such an acoustic dosimeter 50 can be combined by means of software of the computer controller 46 to enable programmed management of the punching operations carried out over the period so as to keep within a preset limit.

I claim:

1. A method of controlling the sound levels produced by the operations of a program controlled punch press having a ram driven through workpiece at a work station to punch a hole therein, a program control causing a series of punching operation to be carried out in said punch press over a timer period of operation thereof with a programmed ram velocity, the method comprising the steps of:

positioning a sound detector adjacent the punch station, and monitoring therewith the actual sound level at said sound detector produced by a sampled punching operation in said programmed operation, in real time; and projecting a time weighted average sound level which will be produced over said time period of operation of said punch press from said sound levels detected in said monitoring step, and reprogramming said control program in real time to vary the programmed ram velocity for subsequent programmed punching operations during said time period of operation so as to maintain said time weighted average sound level within preset limits.

* * * * *